United States Patent
Takeda et al.

(10) Patent No.: US 12,414,123 B2
(45) Date of Patent: Sep. 9, 2025

(54) NUMBER OF BD AND CCE FOR CROSS-CARRIER SCHEDULING FROM AN S-CELL TO A P-CELL

(71) Applicant: QUALCOMM Incorporated, San Diego, CA (US)

(72) Inventors: Kazuki Takeda, Tokyo (JP); Huilin Xu, Temecula, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/356,458

(22) Filed: Jun. 23, 2021

(65) Prior Publication Data
US 2022/0046683 A1 Feb. 10, 2022

Related U.S. Application Data

(60) Provisional application No. 63/062,607, filed on Aug. 7, 2020.

(51) Int. Cl.
H04W 72/23 (2023.01)
H04L 27/26 (2006.01)
(Continued)

(52) U.S. Cl.
CPC ....... *H04W 72/23* (2023.01); *H04L 27/26025* (2021.01); *H04W 24/08* (2013.01); *H04W 72/0453* (2013.01); *H04W 72/1273* (2013.01)

(58) Field of Classification Search
CPC .................................................. H04W 72/23
See application file for complete search history.

(56) References Cited

U.S. PATENT DOCUMENTS

2012/0218969 A1* 8/2012 Tan .................. H04L 5/0051
370/329
2015/0327223 A1* 11/2015 Zhang .................. H04W 72/23
370/329
(Continued)

FOREIGN PATENT DOCUMENTS

CN 104126328 A 10/2014
CN 104823395 A 8/2015
(Continued)

OTHER PUBLICATIONS

CMCC: "Discussion on Remaining Issues for PDCCH and Search Space", 3GPP TSG RAN WG1 Meeting #94, 3GPP Draft, R1-1808833, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, 3 Pages, Aug. 11, 2018 (Aug. 11, 2018), XP051516206, Retrieved from the Internet: URL: http://www.3gpp.org/ftp/tsg%5Fran/WG1%5FRL1/TSGR1%5F94/Docs/R1%2D1808833%2Ezip [retrieved on Aug. 11, 2018] sections 1-4.
(Continued)

*Primary Examiner* — Jason E Mattis
(74) *Attorney, Agent, or Firm* — Procopio, Cory, Hargreaves & Savitch

(57) ABSTRACT

This disclosure provides systems, devices, apparatus, and methods, including computer programs encoded on storage media, for determining numbers of BDs and CCEs for cross-carrier scheduling from a SCell to a PCell/PSCell. A UE may concurrently monitor, on different component carriers, a first PDCCH and a second PDCCH having different SCSs. The PDCCHs may each be configured to schedule PDSCH or PUSCH on a same component carrier of the different component carriers. Each of the PDCCHs may be associated with a respective number of PDCCH candidates or a respective number of non-overlapped CCEs, the respec-
(Continued)

tive numbers further associated with respective maximum numbers based on the different SCSs. A first sum of the respective number of PDCCH candidates or a second sum of the non-overlapped CCEs may be less than or equal to N times the lower of the respective maximum numbers.

31 Claims, 11 Drawing Sheets

(51) Int. Cl.
*H04W 24/08* (2009.01)
*H04W 72/0453* (2023.01)
*H04W 72/1273* (2023.01)

(56) References Cited

U.S. PATENT DOCUMENTS

| | | | |
|---|---|---|---|
| 2019/0223164 A1* | 7/2019 | He | H04W 76/27 |
| 2021/0058189 A1* | 2/2021 | Xiao | H04L 5/0042 |
| 2021/0136770 A1* | 5/2021 | Nakashima | H04W 72/0453 |
| 2021/0377996 A1* | 12/2021 | Lee | H04L 5/001 |
| 2023/0077644 A1* | 3/2023 | Shi | H04L 5/0053 |
| 2023/0080720 A1* | 3/2023 | Yoon | H04W 72/0453 |

FOREIGN PATENT DOCUMENTS

| | | |
|---|---|---|
| CN | 108886457 A | 11/2018 |
| CN | 110474737 A | 11/2019 |
| EP | 3780468 A1 | 2/2021 |
| JP | 2013526116 A | 6/2013 |
| WO | 2019214596 A1 | 11/2019 |

OTHER PUBLICATIONS

International Search Report and Written Opinion—PCT/US2021/038986—ISA/EPO—dated Oct. 11, 2021.
Zeng L., et al., "A Novel Cross-Carrier Scheduling Method in Carrier Aggregation," International Conference on Computational Problem-Solving (ICCP), 2013, pp. 312-315.

* cited by examiner

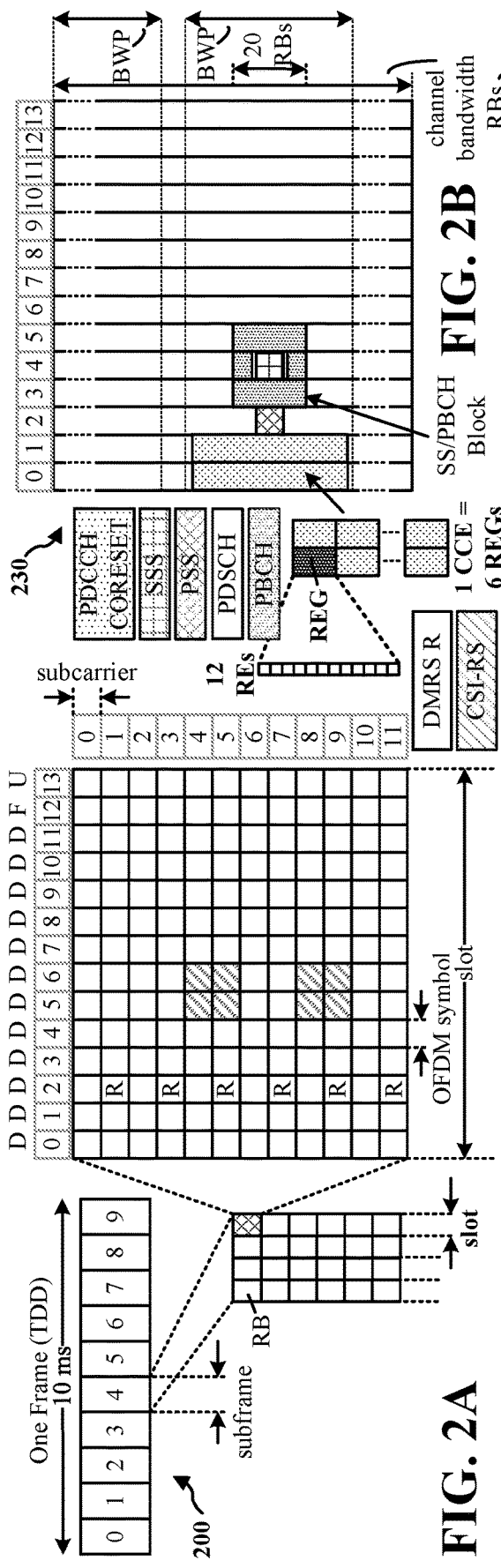
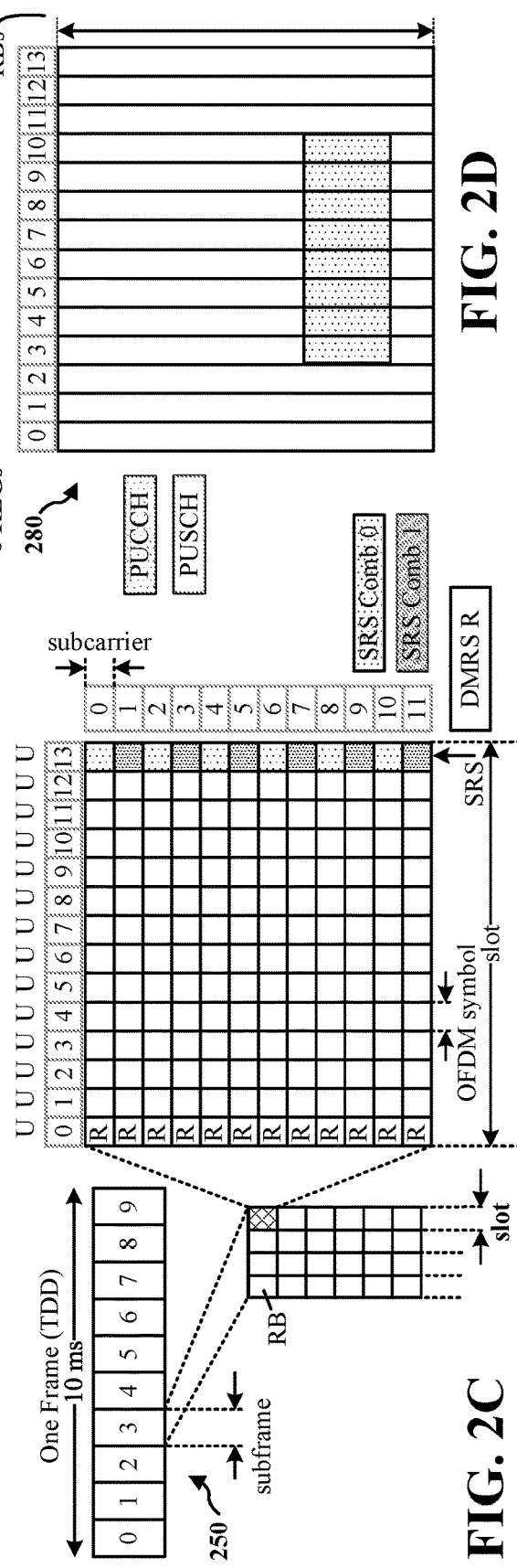
FIG. 2A
FIG. 2B
FIG. 2C
FIG. 2D

NUMBER OF BD AND CCE FOR CROSS-CARRIER SCHEDULING FROM AN S-CELL TO A P-CELL

CROSS REFERENCE TO RELATED APPLICATION(S)

This application claims the benefit of and priority to U.S. Provisional Application Ser. No. 63/062,607, entitled "Number of BD and CCE for Cross-Carrier Scheduling from a S-Cell to a P-Cell" and filed on Aug. 7, 2020, which is expressly incorporated by reference herein in its entirety.

TECHNICAL FIELD

The present disclosure relates generally to communication systems, and more particularly, to numbers of blind decodings (BDs) and control channel elements (CCEs) for cross-carrier scheduling from a secondary cell (SCell) to a primary cell (PCell)/primary-secondary cell (PSCell).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In cross-carrier scheduling operations, data may be scheduled from a SCell to either a PCell or a PSCell. In some cases, cross-carrier scheduling may be associated with two scheduling cells that are configured to schedule data on a same PCell/PSCell. While such techniques may increase a number of physical downlink control channel (PDCCH) candidates that may schedule data on the PCell/PSCell, processing capabilities of a user equipment (UE) may limit the number of PDCCH candidates that the UE may be configured to process.

Accordingly, a total number of PDCCH candidates to be received from the SCell and the PCell/PSCell may need to be regulated based on the processing capabilities of the UE. In a first aspect, e.g., where the SCell and the PCell/PSCell use different numerologies, the maximum number of PDCCH candidates may be based on a predefined budget for the component carrier (CC) with the lowest subcarrier spacing (SCS). That is, the total budget across both CCs may not exceed the budget associated with the lowest SCS. In a second aspect, the maximum number of PDCCH candidates may be counted separately per cell. UE capability information reported to the network may indicate whether the UE is configured to process the number of PDCCH candidates associated with the respective CCs.

In an aspect of the disclosure, a method, a computer-readable medium, and an apparatus are provided. The apparatus may be a UE that includes a memory and at least one processor coupled to the memory. The memory may include instructions that, when executed by the at least one processor, cause the at least one processor to monitor a first PDCCH on a first CC, the first PDCCH being configured to schedule one of a first physical downlink shared channel (PDSCH) or a first physical uplink shared channel (PUSCH) on a second CC, the first PDCCH having a first subcarrier spacing, the first PDCCH in association with the scheduling of the at least one of the first PDSCH or the first PUSCH on the second CC being associated with at least one of a first number of PDCCH candidates or a first number of non-overlapped CCEs, the first PDCCH having a first maximum number in association with the at least one of the first number of PDCCH candidates or the first number of non-overlapped CCEs based on the first subcarrier spacing; and monitor a second PDCCH on a second CC different than the first CC concurrently with the monitoring of the first PDCCH, the second PDCCH being configured to schedule one of a second PDSCH or a second PUSCH on the second CC, the second PDCCH having a second subcarrier spacing less than or equal to the first subcarrier spacing, the second PDCCH in association with the scheduling of the at least one of the second PDSCH or the second PUSCH on the second CC being associated with at least one of a second number of PDCCH candidates or a second number of non-overlapped CCEs, the second PDCCH having a second maximum number in association with the at least one of the second number of PDCCH candidates or the second number of non-overlapped CCEs based on the second subcarrier spacing, where at least one of a first sum of the first number of PDCCH candidates and the second number of PDCCH candidates is less than or equal to N times the second maximum number in association with the second number of PDCCH candidates, or a second sum of the first number of non-overlapped CCEs and the second number of non-overlapped CCEs is less than or equal to N times the second maximum number in association with the second number of non-overlapped CCEs.

In an aspect of the disclosure, a method, a computer-readable medium, and an apparatus are provided. The apparatus may be a base station that includes a memory and at least one processor coupled to the memory. The memory may include instructions that, when executed by the at least one processor, cause the at least one processor to configure a first PDCCH on a first CC for a UE, the first PDCCH being configured to schedule one of a first physical downlink shared channel (PDSCH) or a first PUSCH on a second CC, the first PDCCH having a first subcarrier spacing, the first PDCCH in association with the scheduling of the at least one of the first PDSCH or the first PUSCH on the second CC being associated with at least one of a first number of PDCCH candidates or a first number of non-overlapped CCEs, the first PDCCH having a first maximum number in association with the at least one of the first number of PDCCH candidates or the first number of non-overlapped CCEs based on the first subcarrier spacing; configure a second PDCCH on a second CC different than the first CC, the second PDCCH being configured to schedule one of a second PDSCH or a second PUSCH on the second CC, the second PDCCH being concurrent with the first PDCCH, the second PDCCH having a second subcarrier spacing less than or equal to the first subcarrier spacing, the second PDCCH in association with the scheduling of the at least one of the second PDSCH or the second PUSCH on the second CC being associated with at least one of a second number of PDCCH candidates or a second number of non-overlapped CCEs, the second PDCCH having a second maximum number in association with the at least one of the second number of PDCCH candidates or the second number of non-overlapped CCEs based on the second subcarrier spacing; and transmit, on at least one of the first PDCCH or the second PDCCH, downlink control information (DCI) scheduling one of the first PDSCH, the first PUSCH, the second PDSCH, or the second PUSCH on the second CC, the DCI being associated with at least one of a first sum of the first number of PDCCH candidates and the second number of PDCCH candidates is less than or equal to N times the second maximum number in association with the second number of PDCCH candidates, or a second sum of the first number of non-overlapped CCEs and the second number of non-overlapped CCEs is less than or equal to N times the second maximum number in association with the second number of non-overlapped CCEs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
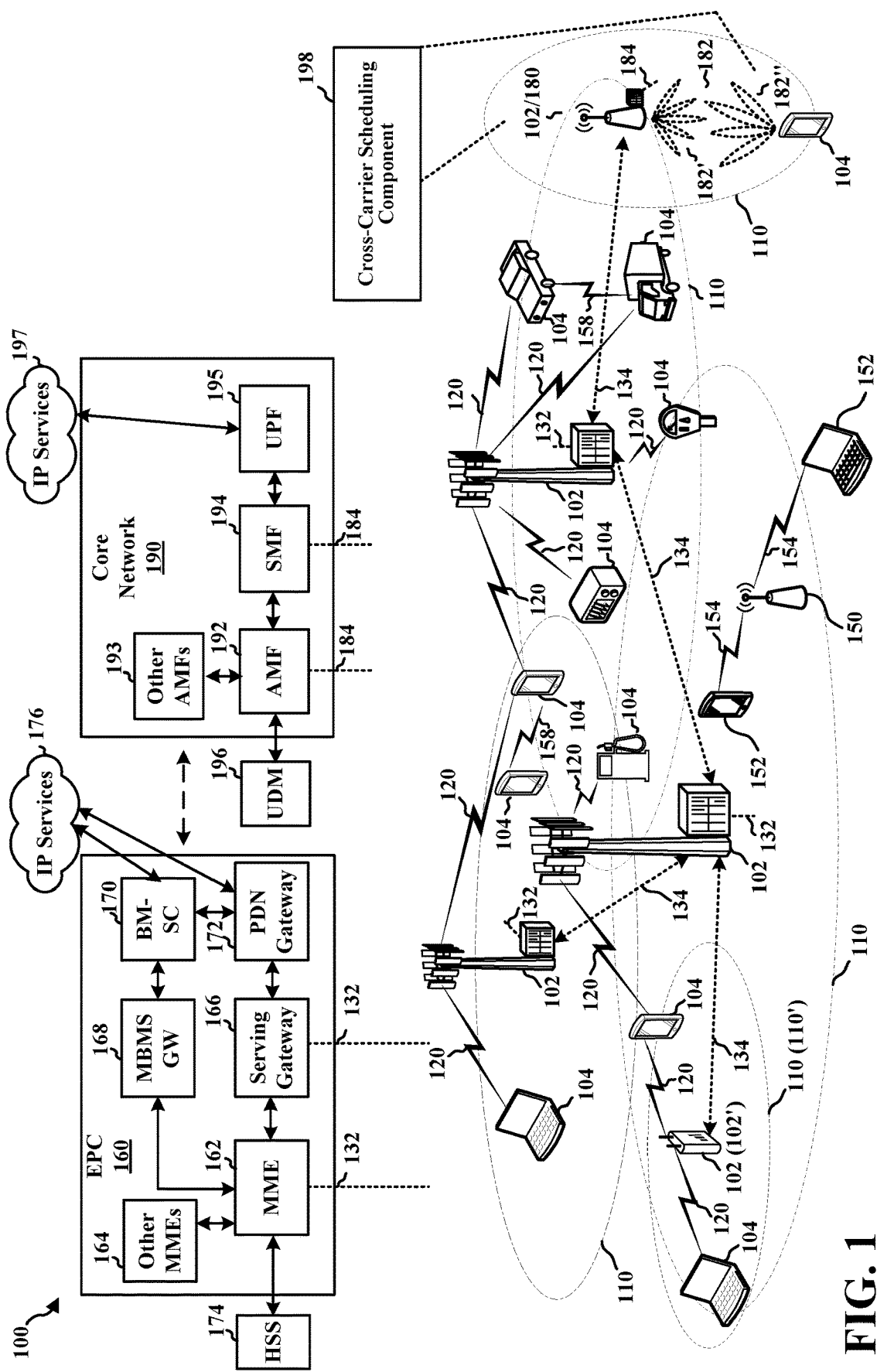
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30

GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 and/or the base station 180 may include a cross-carrier scheduling component 198 configured to monitor concurrently, on different CCs, a first and second PDCCH having different SCSs, each of the PDCCHs being configured to schedule PDSCH or PUSCH on a same CC and being associated with respective maximum numbers of PDCCH candidates or non-overlapped CCEs based on the different SCSs, a sum of respective numbers of PDCCH candidates or non-overlapped CCEs for the respective PDCCHs being less than or equal to N times the lower of the respective maximum numbers. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
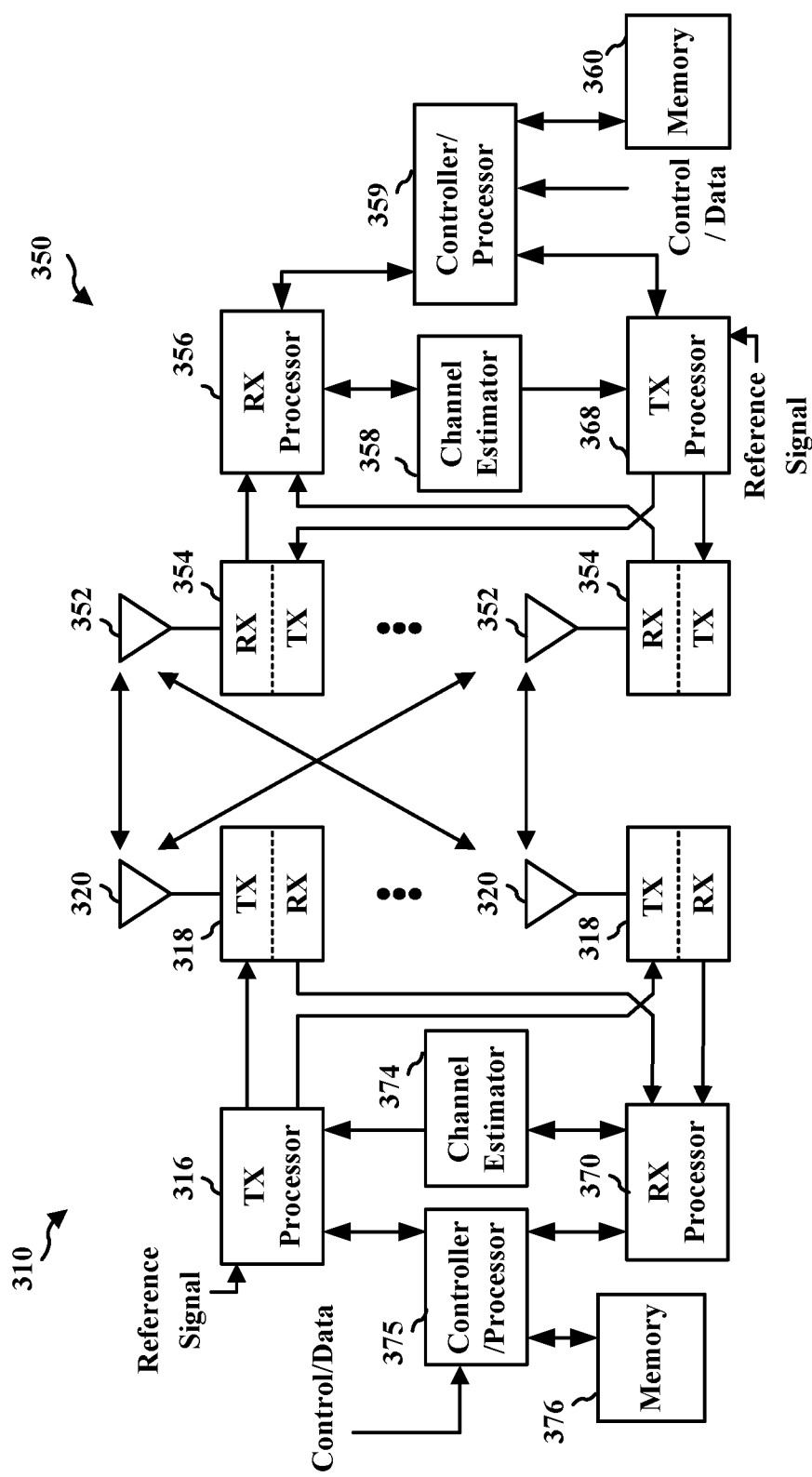
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350.

IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the cross-carrier scheduling component 198 of FIG. 1.

At least one of the TX processor 316, the RX processor 370, and the controller/processor 375 may be configured to perform aspects in connection with the cross carrier scheduling component 198 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
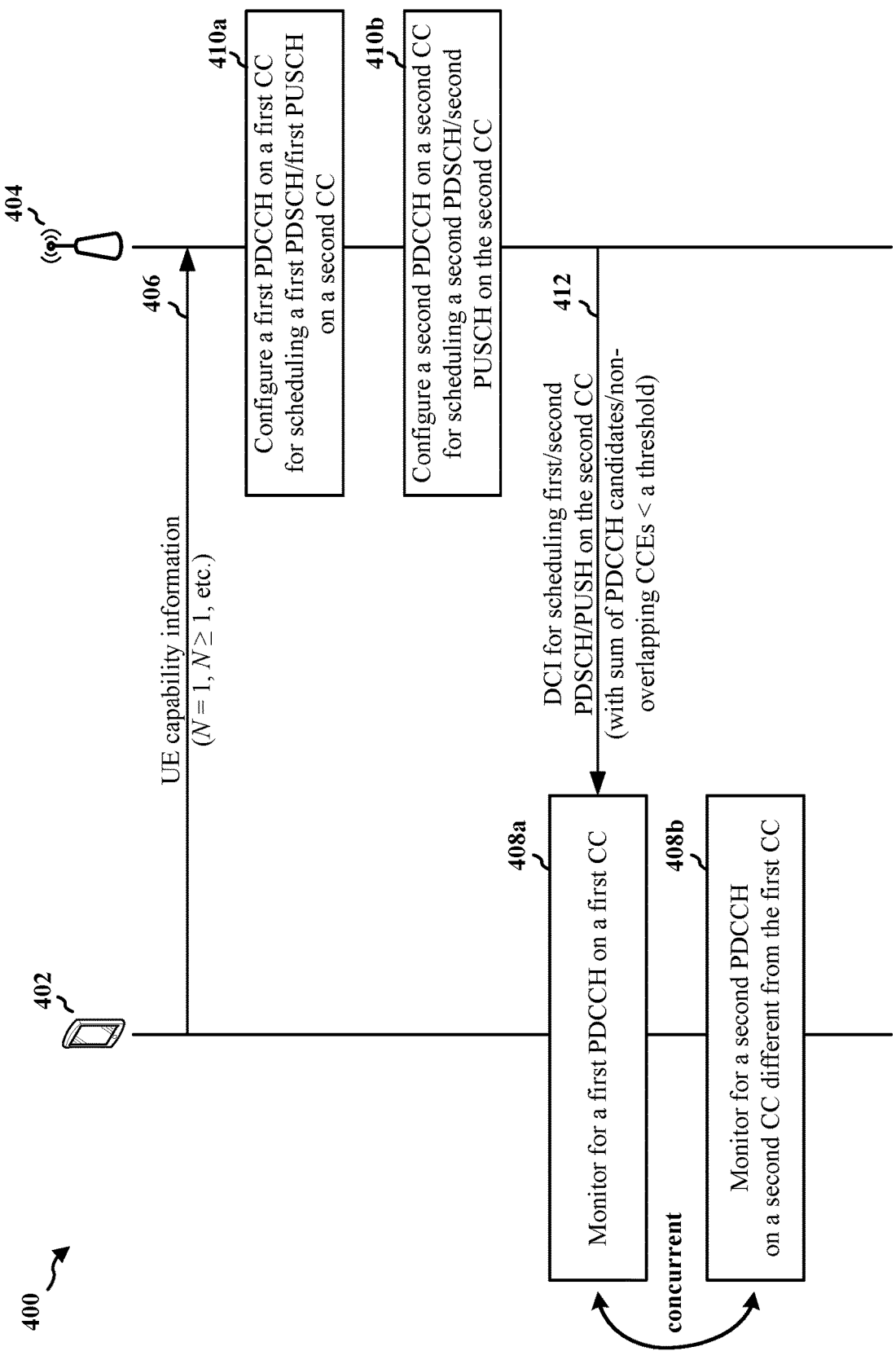
FIG. 4 is a call flow diagram illustrating communications between a UE and a base station.

FIG. 4 is a call flow diagram 400 illustrating communications between a UE 402 and a base station 404. At 406, the UE 402 may transmit UE capability information to the base station 404. For example, the UE 402 may transmit an indication of processing capabilities of the UE 402 for a number of blind decodes (BDs) and/or a number of CCEs. The processing capabilities may be indicated based on N times a maximum number of PDCCH candidates (e.g., N=1, N≥1, etc.).

At 410a, the base station 404 may configure a first PDCCH on a first component carrier (CC) for scheduling a first PDSCH or a first PUSCH on a second CC different from the first CC. At 410b, the base station 404 may similarly configure a second PDCCH on a second CC for scheduling the second PDSCH or the second PUSCH on the second CC. In examples, the base station 404 may configure the first PDCCH and the second PDCCH, at 410a-410b, after receiving the UE capability information, at 406.

At 408a, the UE 402 may monitor for the first PDCCH on the first CC. The first PDCCH may be configured to schedule the first PDSCH or the first PUSCH on the second CC. At 408b, concurrent with the monitoring of the first PDCCH, the UE 402 may monitor for the second PDCCH on the second CC different from the first CC. The second PDCCH may be similarly configured to schedule second PDSCH or second PUSCH on the second CC. At 412, the base station 404 may transmit DCI for scheduling the first/second PDSCH/PUSCH on the second CC, where a sum of PDCCH candidates or non-overlapping CCEs may be less than a predefined threshold.

Figure 5:
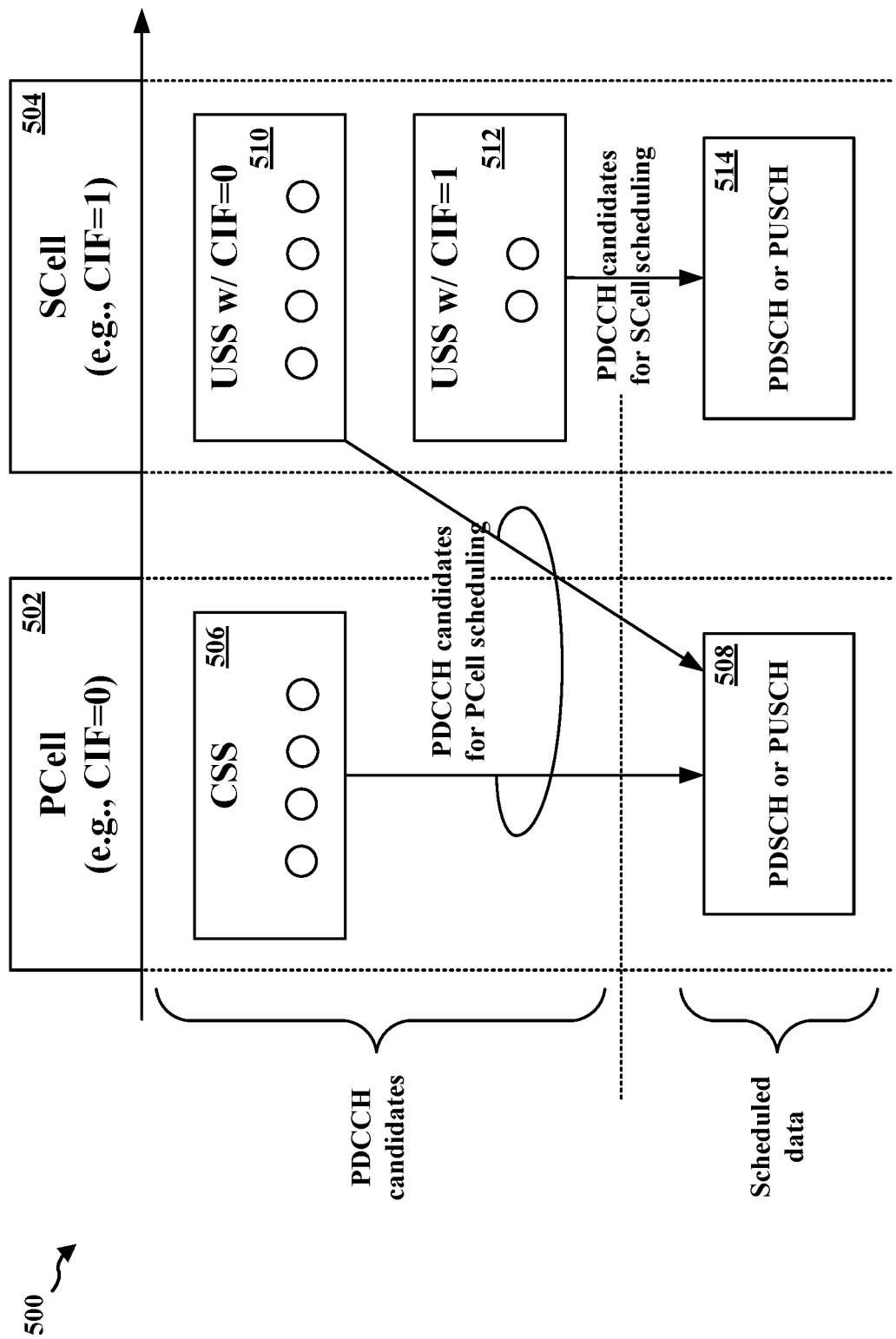
FIG. 5 is a diagram illustrating cross-carrier scheduling from a secondary cell (SCell) to a primary cell (PCell).

FIG. 5 is a diagram 500 illustrating cross-carrier scheduling from a secondary cell (SCell) 504 to a primary cell (PCell) 502. In further configurations, the cross-carrier scheduling may be from the SCell 504 to a primary-secondary cell (PSCell).

Dynamic spectrum sharing (DSS) in frequency range 1 (FR1) may include PDCCH enhancements for cross-carrier scheduling including a first RAN and to a second RAN. For instance, PDCCH associated with the SCell 504 may be used for scheduling PDSCH or PUSCH, at 508 and 514, on the PCell 502 or on the PSCell. PDCCH scheduling of the PDSCH may occur on multiple cells via a single DCI. In examples, a DCI size may be decreased in association with limiting a number of cells that may be scheduled at a same time to 2 cells. A total PDCCH blind decoding (BD) allocation may not be changed as a result of such operations. Such enhancements are not specific to DSS and may be generally applicable to cross-carrier scheduling in carrier aggregation.

Operational frequency bands for DSS may be based on lower frequency bands for which an NR system may use a subcarrier spacing (SCS) of 15 kHz. Such carriers may be used as an "anchor" for both LTE UEs and NR UEs to ensure a threshold level of connectivity and coverage. In cases of carrier aggregation, the anchor carrier may correspond to the PCell 502. If the carrier corresponds to a DSS carrier, resource availability may be restricted. Given that an increased number of NR carriers on mid-bands/high bands may not use DSS, cross-carrier scheduling may be enabled from the SCell 504 on a mid-band/high band to the PCell 502. Since the carrier on the mid-band/high band may be based on, e.g., 30 kHz SCS, cross-carrier scheduling from the SCell 504 to the PCell 502/PSCell may correspond to different numerologies between the SCell 504 and the PCell 502/PSCell. Accordingly, cross-carrier scheduling from the SCell 504 to the PCell 502/PSCell may be configured for a SCS of 30 kHz or 15 kHz for the SCell 504 (e.g., the scheduling cell) and a SCS of 15 kHz for the PCell 502/PSCell (e.g., the scheduled cell).

Some cross-carrier scheduling techniques may support different numerologies between the scheduling cell and the scheduled cell. That is, cross-carrier scheduling from the SCell 504 to the PCell 502/PSCell may be based on the different numerologies. In examples, cross-carrier scheduling from the SCell 504 to the PCell 502/PSCell may be used for non-fallback DCI with a carrier indication field (CIF) (e.g., CIF=0) that is monitored on a first UE-specific search space (USS) 510. The cross-carrier scheduling may use the CIF in the DCI to indicate which carrier the DCI may schedule the PDSCH/PUSCH, at 508. The UE may determine PDCCH candidates for the DCI scheduling from the SCell 504 to the PCell 502/PSCell based on a value of n_CI for a hash function unless, e.g., search space sharing is enabled based on UE capabilities and conditions. If the PDSCH of the PCell 502 and the PDCCH of the SCell 504 use different SCSs, a PDSCH preparation time may be provided.

In cases where there is one scheduling cell for each scheduled cell, common search spaces (CSS) 506 may be located on the PCell 502. Since the CSS 506 of the PCell 502/PSCell may be associated with functionalities such as system information, paging, random access, fallback operations, hypothetical block error rate (BLER) calculations for a radio link failure (RLF)/link recovery (LR) procedure, etc., maintaining the CSS 506 in the PCell 502/PSCell may provide improved functionality. While no more than one scheduling cell (e.g., SCell 504) may be needed for a given scheduled cell (e.g., PCell 502/PSCell), some NR systems may include more than one scheduling cell for the given scheduled cell. In instances where cross-carrier scheduling is configured for performing the DSS operation on the PCell 502/PSCell, one SCell 504 may still be configured as the scheduling cell for the PCell 502/PSCell.

If unicast data scheduling is available from both the scheduling cell (e.g., SCell 504) and the CSS 506 of the scheduled cell (e.g., PCell 502/PSCell), the UE may not be able to determine from which scheduling cell the UE receives a scheduling grant for PDSCH or PUSCH, at 508, at each scheduling instance. Therefore, the unicast data scheduling may solely be available from the SCell 504. In examples, the UE may be configured to process time-overlapping unicast PDSCH and system information (SI)-radio network temporary identifier (RNTI)(SI-RNTI) PDSCH during paging-RNTI (P-RNTI) triggered SI acquisition for FR1. CSS monitoring may be maintained on the PCell 502/PSCell, so that UE operations associated with system information reception, paging, fallback, RLF, etc. may remain unchanged. DCI with cell-RNTI (C-RNTI) on the CSS 506 of the PCell 502 may be used, e.g., not for unicast data, but for PDCCH ordering.

The diagram 500 shows an example of the cross-carrier scheduling from the SCell 504 to the PCell 502. More specifically, multiple PDCCH candidates (e.g., BDs) may be associated with both the PCell 502 and the SCell 504. Thus, the SCell 504 may schedule PDSCH or PUSCH, at 508, on the PCell 502 via cross-carrier scheduling. If the CSS 506 is moved to the SCell 504, the PCell 502 may have no associated PDCCH candidates. However, since the PCell 502 provides functionality for UE mobility and coverage, the CSS 506 may be maintained on the PCell 502. Thus, in the diagram 500, the CSS 506 may be maintained on the PCell 502, while the first USS 510 may be located on the SCell 504 for the cross-carrier scheduling. Therefore, PDCCH candidates of the PCell 502 and the SCell 504 may schedule PDSCH or PUSCH, at 508, on the PCell 502. For example, all 8 PDCCH candidates illustrated in the diagram 500 associated with the CSS 506 and the first USS 510 may be used for scheduling data on the PCell 502. A second USS 512 (e.g., with CIF=1) may be located on the SCell 504 for PDCCH candidates of the SCell 504 to schedule PDSCH or PUSCH, at 514, on the SCell 504. For example, the two PDCCH candidates illustrated in the diagram 500 as being associated with the second USS 512 may be used for scheduling data on the SCell 504.

A number of BDs and a number of CCEs that a UE may process at a same time may be based on certain limitations. For example, the UE may not process more BDs and/or CCEs at one time than a predefined threshold number. In instances where the UE supports the cross-carrier scheduling from the PCell 502 to the SCell 504, there may be one scheduling cell for a given scheduled cell. For example, for the PDSCH or PUSCH, at 514, on the SCell 504 in the diagram 500 there may be one scheduling cell (e.g., the PCell 502). However, for the PDSCH or PUSCH, at 508, on the PCell 502 in the diagram 500 there may be multiple scheduling cells (e.g., the PCell 502 and the SCell 504). Thus, the maximum number of BDs and non-overlapping CCEs may be regulated so that a PDCCH allocation is not exceeded.

Figure 6A:
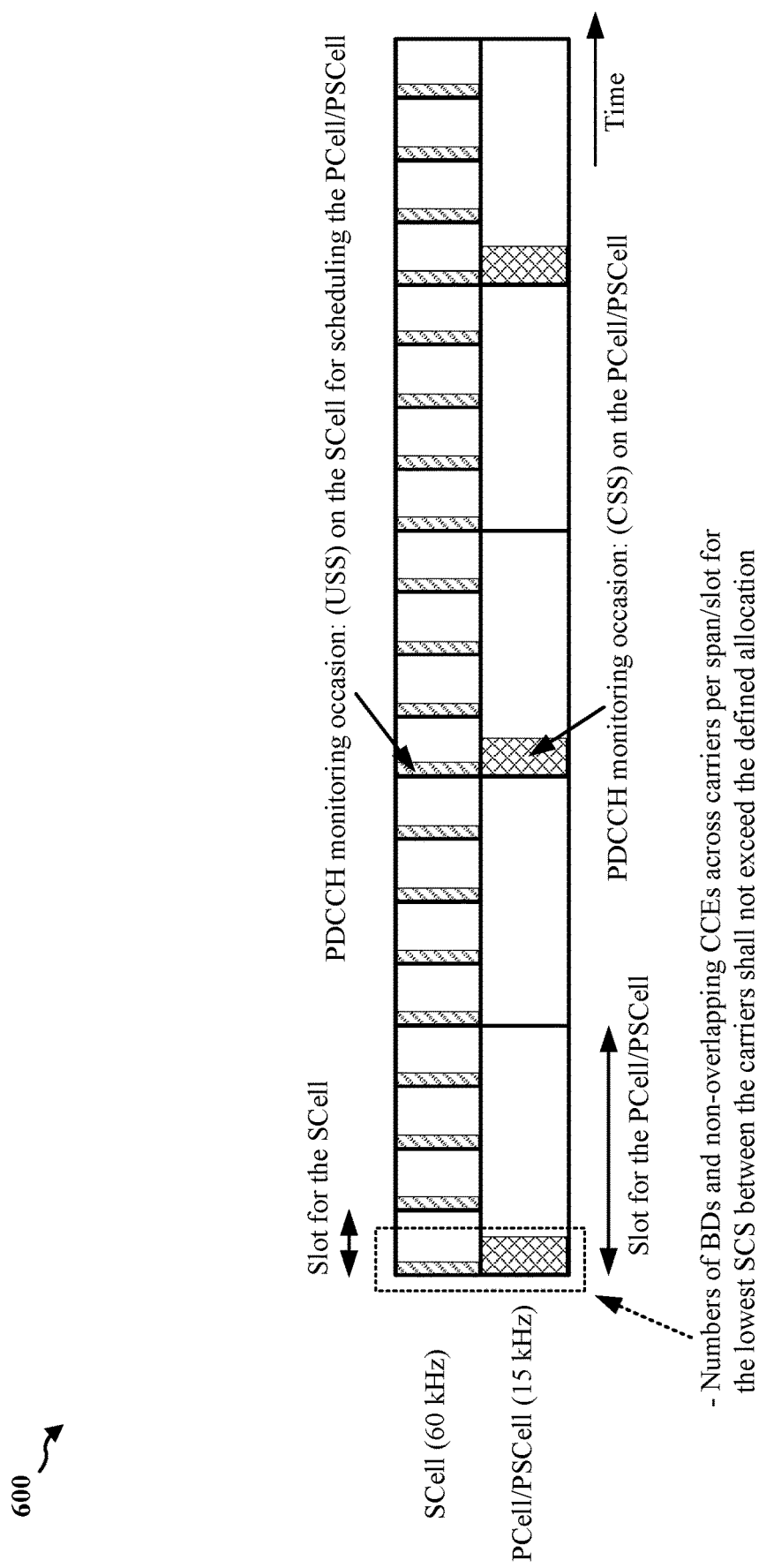
FIGS. 6A-6B illustrate diagrams associated with determining a number of physical downlink control channel (PDCCH) blind decodings (BDs) and non-overlapping control channel elements (CCEs).
Figure 6B:
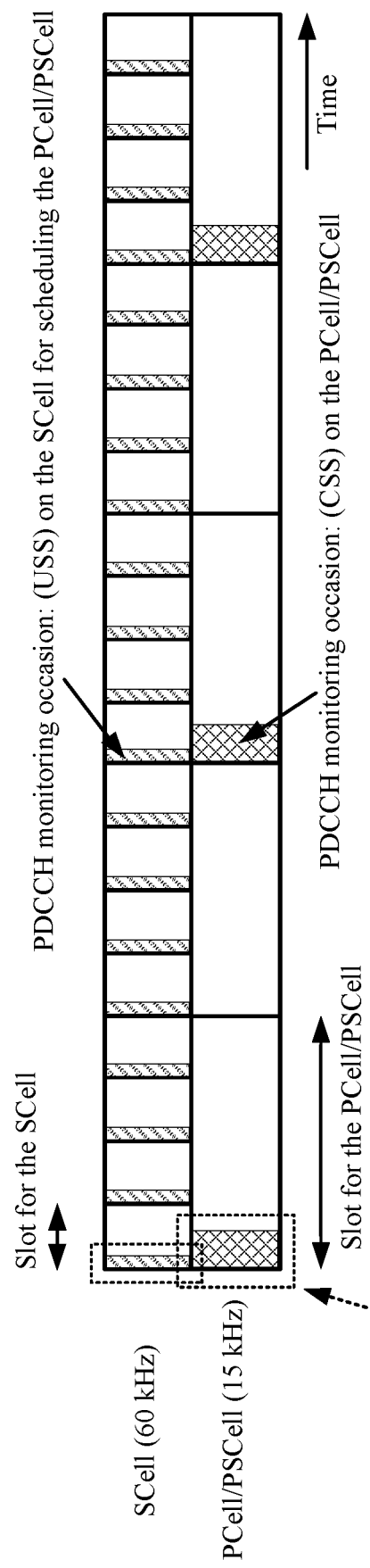

FIGS. 6A-6B illustrate diagrams 600-650 associated with determining a number of PDCCH candidates (e.g., BDs) and a number of non-overlapping CCEs. If two scheduling cells are used for scheduling on the PCell/PSCell, a number of PDCCH BDs/CCEs may be determined based on a count/allocation. That is, the numbers of BDs/CCEs per span/slot may be limited for a given scheduled cell based on processing capabilities of the UE. In the diagram 600, a maximum number of BDs and non-overlapping CCEs may be determined based on a predefined allocation corresponding to the lower SCS (e.g., 15 kHz) of the component carriers (e.g., the lower of a first SCS for the SCell and a second SCS for the PCell/PSCell). In the diagram 650, a maximum number of BDs and non-overlapping CCEs may be determined based on allocations that are separately predefined for the PCell/PSCell and the SCell.

The two component carriers indicated in the diagrams 600-650 for the SCell and the PCell/PSCell may have different SCSs. For example, a first SCS of the SCell may be 60 kHz and a second SCS of the PCell/PSCell may be 15 kHz. Based on the different SCSs of the respective component carriers, the PDCCH monitoring occasions may be different for the first component carrier and the second component carrier. For example, the PCell/PSCell may be associated with one monitoring occasion per slot, whereas the SCell may be associated with four monitoring occasions per slot. The PDCCH monitoring occasions for the PCell/PSCell may be associated with PDCCH candidates received from the CSS and the PDCCH monitoring occasions for the SCell may be associated with PDCCH candidates received from the USS.

In the diagram 600, the numbers of BDs and non-overlapping CCEs per span/slot may be counted over the data scheduling cell for the PCell/PSCell. The counted number of BDs and non-overlapping CCEs may not be more than the predefined allocation per span/slot per component carrier (e.g., there may be no overscheduling of the PDCCH). In examples, a BD allocation per span/slot per component carrier may be up to 44 BDs for a 15 kHz carrier. As such, 44 BDs may be the BD allocation (e.g., the maximum number that may not be exceeded) over the carrier for the PCell/PSCell.

If the scheduling cell (e.g., SCell) and the scheduled cell (e.g., PCell/PSCell) use different numerologies, the per span/slot threshold may be determined based on the lower SCS (e.g., the per span/slot having the component carrier with the lower SCS). In the diagram 600, the per span/slot threshold of the component carrier with the lowest SCS may correspond to the 15 kHz carrier (e.g., the span/slot of the PDCCH monitoring occasion for the PCell/PSCell). The number of BDs across the PCell/PSCell and the SCell may not exceed the lower BD allocation of the multiple scheduling carriers. In this manner, the BD allocation may be capped based on a per cell budget, even though the number of BDs may extend across the multiple scheduling carriers.

In the diagram 650, the number of BDs or non-overlapping CCEs may be defined per scheduling cell, including data scheduling on the PCell/PSCell. That is, the number of BDs or non-overlapping CCEs may be counted separately per cell. For example, the PDCCH monitoring occasion for the PCell/PSCell may have up to 44 PDCCH candidates (e.g., BDs) and the PDCCH monitoring occasion for the SCell may have up to 44 PDCCH candidates. The UE may report UE capability information to the network indicative of whether the UE is configured to process 88 PDCCH candidates (e.g., 44+44) or whether the UE is solely configured, e.g., to process up to 44 PDCCH candidates over all of the carriers.

Accordingly, the numbers of BDs and non-overlapping CCEs per span/slot may be counted per scheduling cell for scheduling the PCell/PSCell. The counted number of BDs and non-overlapping CCEs for a given scheduling cell per span/slot may not be more than a predefined allocation per span/slot per carrier. While the diagram 650 similarly indicates that there may be no PDCCH overscheduling, the per carrier allocation in the diagram 650 may be available for each of the scheduling cells. The UE may be configured to report UE capability information regarding the number of BD and non-overlapping CCEs per span/slot for the PCell/PSCell, such that configurations having the total number of BDs/non-overlapping CCEs over the carriers per span/slot for the PCell/PSCell may not exceed the predetermined allocations per span/slot per carrier.

The UE may report the processing capability of the UE to the network via capability signalling. In examples, if the UE reports the value N via the capability signalling where, e.g., N may be determined based on a hash function, the UE may support a total number of BDs/non-overlapping CCEs over the carriers per span/slot for the PCell/PSCell of up to N times the predetermined allocations per span/slot per carrier. For example, if the UE reports N=2, the UE may support 44+44 BDs/non-overlapping CCEs. If the UE reports N=1, the UE may support a total number of BDs/non-overlapping CCEs over the carriers per span/slot for the PCell/PSCell that is not more than the predetermined allocations per span/slot per carrier (e.g., 44 PDCCH candidates over the carriers).

Figure 7:
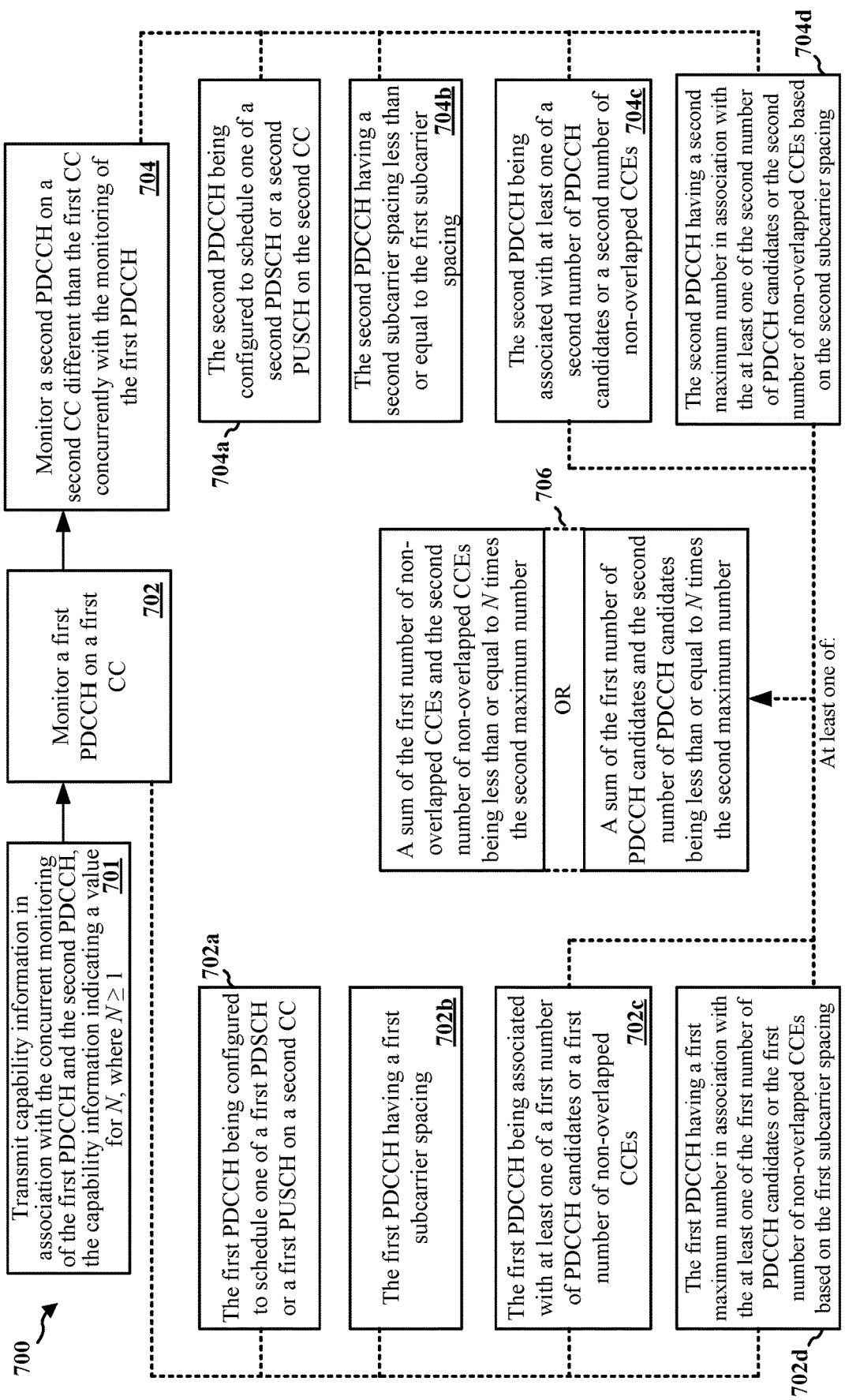
FIG. 7 is a flowchart of a method of wireless communication to be performed at a UE.

FIG. 7 is a flowchart 700 of a method of wireless communication. The method may be performed by a UE, e.g., the UE 104, which may include the memory 360 and which may be the entire UE 104 or a component of the UE 104, such as the TX processor 368, the RX processor 356, and/or the controller/processor 359.

At 701, the UE may transmit capability information in association with concurrent monitoring of a first PDCCH and a second PDCCH. For example, referring to FIG. 4, the UE 402 may transmit, at 406, UE capability information to the base station 404. The capability information may indicate a value for N, where N≥1.

At 702, the UE may monitor a first PDCCH on a first CC. For example, referring to FIG. 4, the UE 402 may monitor, at 408a, a first PDCCH on the first CC.

At 702a, the first PDCCH may be configured to schedule one of a first PDSCH or a first PUSCH on a second CC. For example, referring to FIG. 5, the PDCCH associated with the SCell may be configured to schedule PDSCH or PUSCH on the PCell.

At 702b, the first PDCCH may have a first subcarrier spacing. For example, referring to FIGS. 6A-6B, the SCS of the SCell may be 60 kHz.

At 702c, the first PDCCH in association with the scheduling of the at least one of the first PDSCH or the first PUSCH on the second CC may be associated with at least one of a first number of PDCCH candidates or a first number of non-overlapped CCEs. For example, referring to FIGS. 5 and 6A-6B, the PDCCH associated with the cross-carrier scheduling of the PDSCH/PUSCH from the SCell to the PCell may be further associated with a number of BDs in a PDCCH monitoring occasion or a number of non-overlapping CCEs, as indicated in the diagrams 600-650.

At 702d, the first PDCCH may have a first maximum number in association with the at least one of the first number of PDCCH candidates or the first number of non-overlapped CCEs based on the first subcarrier spacing. For example, referring to FIG. 6B, the diagram 650 indicates that the number of BDs and non-overlapping CCEs for the SCell may not exceed a defined budget of the SCell based on the SCS of 60 kHz.

At 704, the UE may monitor a second PDCCH on a second CC different than the first CC concurrently with the monitoring of the first PDCCH. For example, referring to FIG. 4, the UE 402 may monitor, at 408b, a second PDCCH on a second CC different from the first CC. The monitoring, at 408b, for the second PDCCH may be performed concurrently with the monitoring, at 408a, for the first PDCCH. As illustrated in the diagrams 600-650, the first CC may be associated with the SCell and the second CC may be associated with one of the PCell or the PSCell. In aspects, the first CC and the second CC may be in different frequency bands. For example, the first CC may be associated with a higher frequency range than the second CC.

At 704a, the second PDCCH may be configured to schedule one of a second PDSCH or a second PUSCH on the second CC. For example, referring to FIG. 5, the PDCCH associated with the PCell may be configured to schedule PDSCH or PUSCH on the PCell.

At 704b, the second PDCCH may have a second subcarrier spacing less than or equal to the first subcarrier spacing. For example, referring to FIGS. 6A-6B, the SCS of the PCell may be 15 kHz, which is less than the SCS of the SCell (e.g., 60 kHz). That is, the second subcarrier spacing may be less than the first subcarrier spacing.

At 704c, the second PDCCH in association with the scheduling of the at least one of the second PDSCH or the second PUSCH on the second CC may be associated with at least one of a second number of PDCCH candidates or a second number of non-overlapped CCEs. For example, referring to FIGS. 5 and 6A-6B, the PDCCH associated with the PDSCH/PUSCH of the PCell may be further associated with a number of BDs in a PDCCH monitoring occasion or a number of non-overlapping CCEs, as indicated in the diagrams 600-650.

At 704d, the second PDCCH may have a second maximum number in association with the at least one of the second number of PDCCH candidates or the second number of non-overlapped CCEs based on the second subcarrier spacing. For example, referring to FIG. 6B, the diagram 650 indicates that the number of BDs and non-overlapping CCEs for the PCell may not exceed a defined budget of the PCell based on the SCS of 15 kHz.

At 706, a first sum of the first number of PDCCH candidates and the second number of PDCCH candidates may be less than or equal to N times the second maximum number in association with the second number of PDCCH candidates. For example, if the maximum number of PDCCH candidates is 44, referring to FIGS. 6A-6B, N times the total number of PDCCH candidates associated with the PCell and the SCell may be less than 44. In aspects, the value of N may be N=1. As a result, the total number of PDCCH candidates associated with the PCell and the SCell may not be more than 44. Additionally or alternatively, at 706, a second sum of the first number of non-overlapped CCEs and the second number of non-overlapped CCEs may be less than or equal to N times the second maximum number in association with the second number of non-overlapped CCEs.

Figure 8:
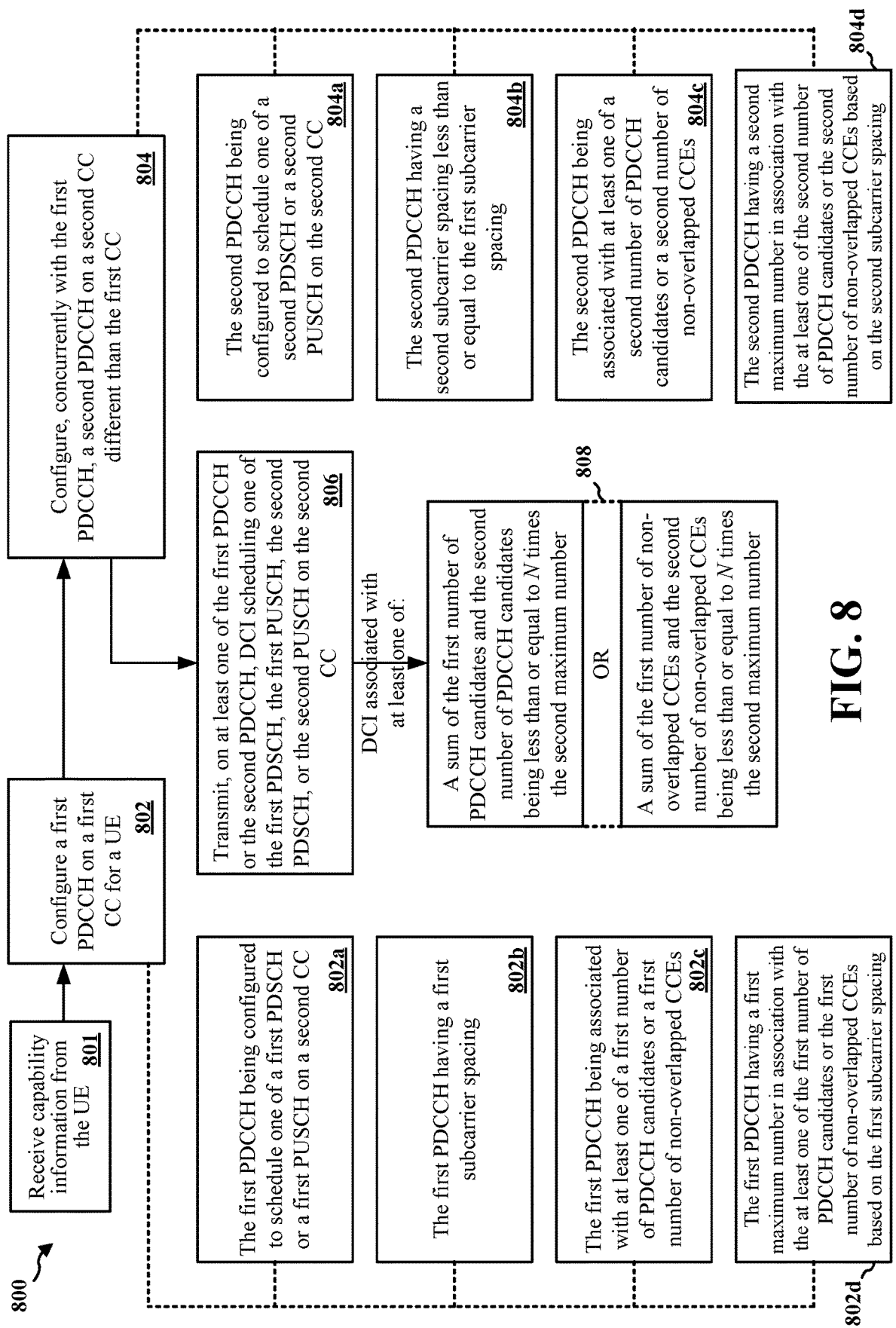
FIG. 8 is a flowchart of a method of wireless communication to be performed at a base station.

FIG. 8 is a flowchart 800 of a method of wireless communication. The method may be performed by a base station, e.g., the base station 102, which may include the memory 376 and which may be the entire base station 102 or a component of the base station 102, such as the TX processor 316, the RX processor 370, and/or the controller/processor 375.

At 801, the base station may receive, from a UE, capability information in association with configuration of a first PDCCH and a second PDCCH. For example, referring to FIG. 4, the base station 404 may receive, at 406, UE capability information from the UE 402. The capability information may indicate a value for N, where N≥1.

At 802, the base station may configure a first PDCCH on a first CC for a UE. For example, referring to FIG. 4, the base station 404 may configure, at 410a, a first PDCCH on the first CC for the UE 402.

At 802a, the first PDCCH may be configured to schedule one of a PDSCH or a first PUSCH on a second CC. For example, referring to FIG. 5, the PDCCH associated with the SCell may be configured to schedule PDSCH or PUSCH on the PCell.

At 802b, the first PDCCH may have a first subcarrier spacing. For example, referring to FIGS. 6A-6B, the SCS of the SCell may be 60 kHz.

At 802c, the first PDCCH in association with the scheduling of the at least one of the first PDSCH or the first PUSCH on the second CC may be associated with at least one of a first number of PDCCH candidates or a first number of non-overlapped CCEs. For example, referring to FIGS. 5 and 6A-6B, the PDCCH associated with the cross-carrier scheduling of the PDSCH/PUSCH from the SCell to the PCell may be further associated with a number of BDs in a PDCCH monitoring occasion or a number of non-overlapping CCEs, as indicated in the diagrams 600-650.

At 802d, the first PDCCH may have a first maximum number in association with the at least one of the first number of PDCCH candidates or the first number of non-overlapped CCEs based on the first subcarrier spacing. For example, referring to FIG. 6B, the diagram 650 indicates that the number of BDs and non-overlapping CCEs for the SCell may not exceed a defined budget of the SCell based on the SCS of 60 kHz.

At 804, the base station may configure a second PDCCH on a second CC different than the first CC, the second PDCCH being concurrent with the first PDCCH. For example, referring to FIG. 4, the base station 404 may configure, at 410b, a second PDCCH on a second CC for the UE 402 for scheduling a second PDSCH/second PUSCH on the second CC. As illustrated in the diagrams 600-650, the first CC may be associated with the SCell and the second CC may be associated with one of the PCell or the PSCell. In aspects, the first CC and the second CC may be in different frequency bands. For example, the first CC may be associated with a higher frequency range than the second CC.

At 804a, the second PDCCH may be configured to schedule one of a second PDSCH or a second PUSCH on the second CC. For example, referring to FIG. 5, the PDCCH associated with the PCell may be configured to schedule PDSCH or PUSCH on the PCell.

At 804b, the second PDCCH may have a second subcarrier spacing less than or equal to the first subcarrier spacing. For example, referring to FIGS. 6A-6B, the SCS of the PCell may be 15 kHz, which is less than the SCS of the SCell (e.g., 60 kHz). That is, the second subcarrier spacing may be less than the first subcarrier spacing.

At 804c, the second PDCCH in association with the scheduling of the at least one of the second PDSCH or the second PUSCH on the second CC may be associated with at least one of a second number of PDCCH candidates or a second number of non-overlapped CCEs. For example, referring to FIGS. 5 and 6A-6B, the PDCCH associated with the PDSCH/PUSCH of the PCell may be further associated with a number of BDs in a PDCCH monitoring occasion or a number of non-overlapping CCEs, as indicated in the diagrams 600-650.

At 804d, the second PDCCH may have a second maximum number in association with the at least one of the second number of PDCCH candidates or the second number of non-overlapped CCEs based on the second subcarrier spacing. For example, referring to FIG. 6B, the diagram 650 indicates that the number of BDs and non-overlapping CCEs for the PCell may not exceed a defined budget of the PCell based on the SCS of 15 kHz.

At 806, the base station may transmit, on at least one of the first PDCCH or the second PDCCH, DCI scheduling one of the first PDSCH, the first PUSCH, the second PDSCH, or the second PUSCH on the second CC. For example, referring to FIG. 4, the base station 404 may transmit, at 412, DCI scheduling first/second PDSCH/PUSCH on the second CC. The sum of the PDCCH candidates and/or non-overlapping CCEs transmitted, at 412, may be less than a predefined threshold.

At 808, the DCI may be associated with a first sum of the first number of PDCCH candidates and the second number of PDCCH candidates, where the first sum may be less than or equal to N times the second maximum number in association with the second number of PDCCH candidates. For example, if the maximum number of PDCCH candidates is 44, referring to FIGS. 6A-6B, N times the total number of PDCCH candidates associated with the PCell and the SCell may be less than 44. In aspects, the value of N may be N=1. As a result, the total number of PDCCH candidates associated with the PCell and the SCell may not be more than 44. Additionally or alternatively, at 808, the DCI may be associated with a second sum of the first number of non-overlapped CCEs and the second number of non-overlapped CCEs, where the second sum may be less than or equal to N times the second maximum number in association with the second number of non-overlapped CCEs.

Figure 9:
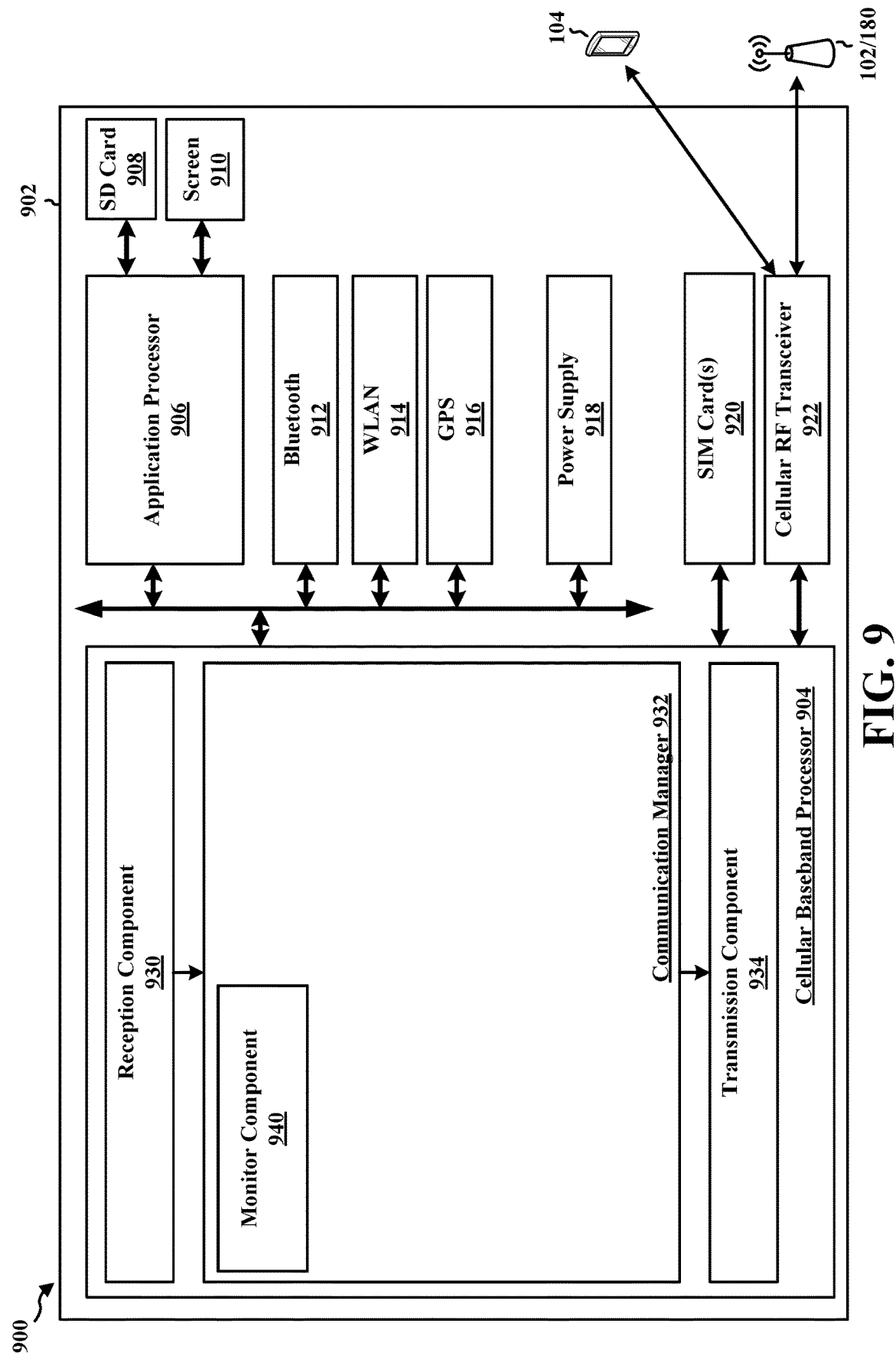
FIG. 9 is a diagram illustrating an example of a hardware implementation for an example apparatus.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the aforediscussed additional modules of the apparatus 902.

The communication manager 932 includes a monitor component 940 that is configured, e.g., as described in connection with 702 and 704, to monitor a first PDCCH on a first CC; and monitor a second PDCCH on a second CC different than the first CC concurrently with the monitoring of the first PDCCH. The transmission component 934 is configured, e.g., as described in connection with 701, to transmit capability information in association with the concurrent monitoring of the first PDCCH and the second PDCCH.

The apparatus may include additional components that perform each of the blocks of the algorithm in the aforementioned flowcharts of FIG. 7. As such, each block in the aforementioned flowcharts of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for monitoring a first physical downlink control channel (PDCCH) on a first component carrier (CC), the first PDCCH being configured to schedule one of a first physical downlink shared channel (PDSCH) or a first physical uplink shared channel (PUSCH) on a second CC, the first PDCCH having a first subcarrier spacing, the first PDCCH in association with the scheduling of the one of the first PDSCH or the first PUSCH on the second CC being associated with at least one of a first number of PDCCH candidates or a first number of non-overlapped control channel elements (CCEs), the first PDCCH having a first maximum number in association with the at least one of the first number of PDCCH candidates or the first number of non-overlapped CCEs based on the first subcarrier spacing; and means for monitoring a second PDCCH on a second CC different than the first CC concurrently with the monitoring of the first PDCCH, the second PDCCH being configured to schedule one of a second PDSCH or a second PUSCH on the second CC, the second PDCCH having a second subcarrier spacing less than or equal to the first subcarrier spacing, the second PDCCH in association with the scheduling of the at least one of the second PDSCH or the second PUSCH on the second CC being associated with at least one of a second number of PDCCH candidates or a second number of non-overlapped CCEs, the second PDCCH having a second maximum number in association with the at least one of the second number of PDCCH candidates or the second number of non-overlapped CCEs based on the second subcarrier spacing, where at least one of a first sum of the first number of PDCCH candidates and the second number of PDCCH candidates is less than or equal to N times the second maximum number in association with the second number of PDCCH candidates, or a second sum of the first number of non-overlapped CCEs and the second number of non-overlapped CCEs is less than or equal to N times the second maximum number in association with the second number of non-overlapped CCEs. The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
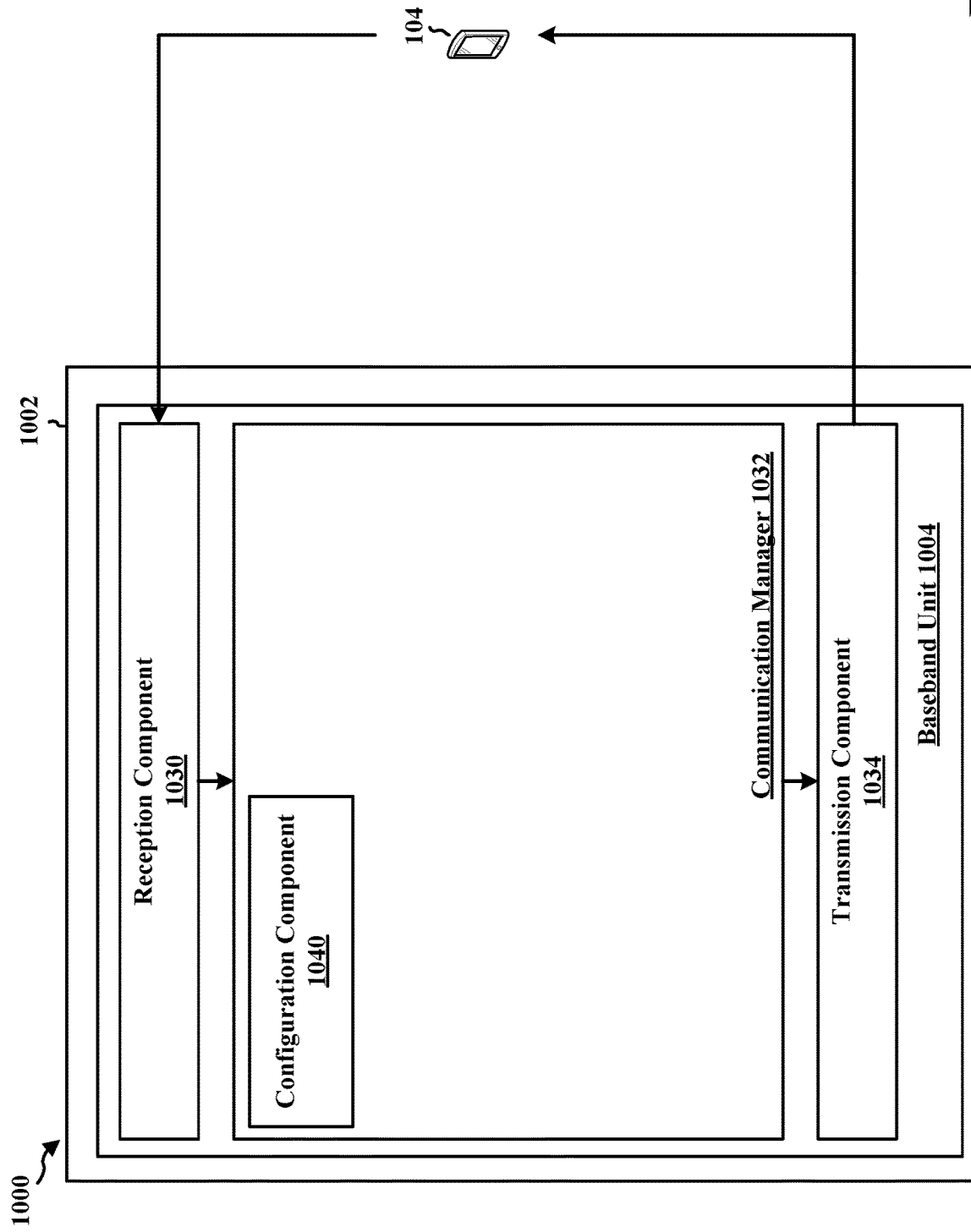
FIG. 10 is a diagram illustrating an example of a hardware implementation for an example apparatus.

FIG. 10 is a diagram 1000 illustrating an example of a hardware implementation for an apparatus 1002. The apparatus 1002 is a BS and includes a baseband unit 1004. The baseband unit 1004 may communicate through a cellular RF transceiver with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the BS 310 and may include the memory 376 and/or at least one of the TX processor 316, the RX processor 370, and the controller/processor 375.

The communication manager 1032 includes a configuration component 1040 that is configured, e.g., as described in connection with 802 and 804, to configure a first PDCCH on a first CC for a UE; and configure a second PDCCH on a second CC different than the first CC. The transmission component 1034 is configured, e.g., as described in connection with 806, to transmit, on at least one of the first PDCCH or the second PDCCH, DCI scheduling one of the first PDSCH, the first PUSCH, the second PDSCH, or the second PUSCH on the second CC.

The apparatus may include additional components that perform each of the blocks of the algorithm in the aforementioned flowcharts of FIG. 8. As such, each block in the aforementioned flowcharts of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for configuring a first physical downlink control channel (PDCCH) on a first component carrier (CC) for a user equipment (UE), the first PDCCH being configured to schedule one of a first physical downlink shared channel (PDSCH) or a first physical uplink shared channel (PUSCH) on a second CC, the first PDCCH having a first subcarrier spacing, the first PDCCH in association with the scheduling of the one of the first PDSCH or the first PUSCH on the second CC being associated with at least one of a first number of PDCCH candidates or a first number of non-overlapped control channel elements (CCEs), the first PDCCH having a first maximum number in association with the at least one of the first number of PDCCH candidates or the first number of non-overlapped CCEs based on the first subcarrier spacing; means for configuring a second PDCCH on a second CC different than the first CC, the second PDCCH being configured to schedule one of a second PDSCH or a second PUSCH on the second CC, the second PDCCH being concurrent with the first PDCCH, the second PDCCH having a second subcarrier spacing less than or equal to the first subcarrier spacing, the second PDCCH in association with the scheduling of the at least one of the second PDSCH or the second PUSCH on the second CC being associated with at least one of a second number of PDCCH candidates or a second number of non-overlapped CCEs, the second PDCCH having a second maximum number in association with the at least one of the second number of PDCCH candidates or the second number of non-overlapped CCEs based on the second subcarrier spacing; and means for transmitting, on at least one of the first PDCCH or the second PDCCH, downlink control information (DCI) scheduling one of the first PDSCH, the first PUSCH, the second PDSCH, or the second PUSCH on the second CC, the DCI being associated with at least one of a first sum of the first number of PDCCH candidates and the second number of PDCCH candidates is less than or equal to N times the second maximum number in association with the second number of PDCCH candidates, or a second sum of the first number of non-overlapped CCEs and the second number of non-overlapped CCEs is less than or equal to N times the second maximum number in association with the second number of non-overlapped CCEs. The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Accordingly, a total number of PDCCH candidates to be received from the SCell and the PCell/PSCell may need to be regulated based on the processing capabilities of the UE. In a first aspect, e.g., where the SCell and the PCell/PSCell use different numerologies, the maximum number of PDCCH candidates may be based on a predefined budget for the CC with the lowest SCS. That is, the total budget across both CCs may not exceed the budget associated with the lowest SCS. In a second aspect, the maximum number of PDCCH candidates may be counted separately per cell. UE capability information reported to the network may indicate whether the UE is configured to process the number of PDCCH candidates associated with the respective CCs.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication to be performed at a UE including at least one processor coupled to a memory and configured to monitor a first PDCCH on a first CC, the first PDCCH being configured to schedule one of a first PDSCH or a first PUSCH on a second CC, the first PDCCH having a first maximum number in association with at least one of a first number of PDCCH candidates or a first number of non-overlapped CCEs; and monitor a second PDCCH on a second CC different than the first CC concurrently with the monitoring of the first PDCCH, the second PDCCH being configured to schedule one of a second PDSCH or a second PUSCH on the second CC, the second PDCCH having a second maximum number in association with at least one of a second number of PDCCH candidates or a second number of non-overlapped CCEs, at least one of a first sum of the first number of PDCCH candidates and the second number of PDCCH candidates is less than or equal to N times the second maximum number in association with the second number of PDCCH candidates, or a second sum of the first number of non-overlapped CCEs and the second number of non-overlapped CCEs is less than or equal to N times the second maximum number in association with the second number of non-overlapped CCEs.

Aspect 2 may be combined with aspect 1 and includes that the first PDCCH in association with the scheduling of the one of the first PDSCH or the first PUSCH on the second CC is associated with at least one of the first number of PDCCH candidates or the first number of non-overlapped CCEs, and the second PDCCH in association with the scheduling of the at least one of the second PDSCH or the second PUSCH on the second CC is associated with at least one of the second number of PDCCH candidates or the second number of non-overlapped CCEs.

Aspect 3 may be combined with any of aspects 1-2 and includes that the first PDCCH includes a first subcarrier spacing, and the second PDCCH includes a second subcarrier spacing that is less than or equal to the first subcarrier spacing.

Aspect 4 may be combined with any of aspects 1-3 and includes that the first maximum number in association with the at least one of the first number of PDCCH candidates or the first number of non-overlapped CCEs is based on the first subcarrier spacing, and the second maximum number in association with the at least one of the second number of PDCCH candidates or the second number of non-overlapped CCEs is based on the second subcarrier spacing.

Aspect 5 may be combined with any of aspects 1-4 and includes that the first CC is associated with an SCell, and the second CC is associated with one of a PCell or a PSCell.

Aspect 6 may be combined with any of aspects 1-5 and includes that the first CC and the second CC are in different frequency bands.

Aspect 7 may be combined with any of aspects 1-6 and includes that the first CC is associated with a higher frequency range than the second CC.

Aspect 8 may be combined with any of aspects 1-7 and includes that N is a multiplier associated with a processing capability of the UE to process at least one of a total number of PDCCH candidates or a total number of non-overlapped CCEs, the total number of PDCCH candidates including the first number of PDCCH candidates and the second number of PDCCH candidates, the total number of non-overlapped CCEs including the first number of non-overlapped CCEs and the second number of non-overlapped CCEs.

Aspect 9 may be combined with any of aspects 1-8 and includes that N=1.

Aspect 10 may be combined with any of aspects 1-9 and includes that the at least one processor is further configured to transmit capability information in association with the concurrent monitoring of the first PDCCH and the second PDCCH, the capability information indicating a value for N, where N≥1.

Aspect 11 is an apparatus for wireless communication to be performed at a base station including at least one processor coupled to a memory and configured to configure a first PDCCH on a first CC for a UE, the first PDCCH being configured to schedule one of a first PDSCH or a PUSCH on a second CC, the first PDCCH having a first maximum number in association with at least one of a first number of PDCCH candidates or a first number of non-overlapped CCEs; configure a second PDCCH on a second CC different than the first CC, the second PDCCH being configured to schedule one of a second PDSCH or a second PUSCH on the second CC, the second PDCCH being concurrent with the first PDCCH, the second PDCCH having a second maximum number in association with at least one of a second number of PDCCH candidates or a second number of non-overlapped CCEs; and transmit, on at least one of the first PDCCH or the second PDCCH, DCI scheduling one of the first PDSCH, the first PUSCH, the second PDSCH, or the second PUSCH on the second CC, the DCI associated with at least one of a first sum of the first number of PDCCH candidates and the second number of PDCCH candidates being less than or equal to N times the second maximum number in association with the second number of PDCCH candidates, or a second sum of the first number of non-overlapped CCEs and the second number of non-overlapped CCEs being less than or equal to N times the second maximum number in association with the second number of non-overlapped CCEs.

Aspect 12 may be combined with aspect 11 and includes that the first PDCCH in association with the scheduling of the one of the first PDSCH or the first PUSCH on the second CC is associated with at least one of the first number of PDCCH candidates or the first number of non-overlapped CCEs, and the second PDCCH in association with the scheduling of the at least one of the second PDSCH or the second PUSCH on the second CC is associated with at least one of the second number of PDCCH candidates or the second number of non-overlapped CCEs.

Aspect 13 may be combined with any of aspects 11-12 and includes that the first PDCCH includes a first subcarrier spacing, and the second PDCCH includes a second subcarrier spacing that is less than or equal to the first subcarrier spacing.

Aspect 14 may be combined with any of aspects 11-13 and includes that the first maximum number in association with the at least one of the first number of PDCCH candidates or the first number of non-overlapped CCEs is based on the first subcarrier spacing, and the second maximum number in association with the at least one of the second number of PDCCH candidates or the second number of non-overlapped CCEs is based on the second subcarrier spacing.

Aspect 15 may be combined with any of aspects 11-14 and includes that the first CC is associated with an SCell, and the second CC is associated with one of a PCell or a PSCell.

Aspect 16 may be combined with any of aspects 11-15 and includes that the first CC and the second CC are in different frequency bands.

Aspect 17 may be combined with any of aspects 11-16 and includes that the first CC is associated with a higher frequency range than the second CC.

Aspect 18 may be combined with any of aspects 11-17 and includes that N is a multiplier associated with a processing capability of the UE to process at least one of a total number of PDCCH candidates or a total number of non-overlapped CCEs, the total number of PDCCH candidates including the first number of PDCCH candidates and the second number of PDCCH candidates, the total number of non-overlapped CCEs including the first number of non-overlapped CCEs and the second number of non-overlapped CCEs.

Aspect 19 may be combined with any of aspects 11-18 and includes that N=1.

Aspect 20 may be combined with any of aspects 11-19 and includes that the at least one processor is further configured to receive, from the UE, capability information in association with concurrent configuration of the first PDCCH and the second PDCCH, the capability information indicating a value for N, where N≥1.

Aspect 21 may be combined with any of aspects 1-20 and further includes that a transceiver is coupled to the at least one processor.

Aspect 22 is a method of wireless communication for implementing any of aspects 1-21.

Aspect 23 is an apparatus for wireless communication including means for implementing any of aspects 1-21.

Aspect 24 is a computer-readable medium storing computer executable code, the code when executed by at least one processor causes the at least one processor to implement any of aspects 1-21.

What is claimed is:

1. An apparatus for wireless communication to be performed at a user equipment (UE), comprising:
   memory; and
   at least one processor coupled to the memory and configured to:
   monitor a first physical downlink control channel (PDCCH) on a first component carrier (CC) associated with a secondary cell (SCell), the first PDCCH being configured to schedule one of a first physical downlink shared channel (PDSCH) or a first physical uplink shared channel (PUSCH) on a second CC associated with one of a primary cell (PCell) or a primary secondary cell (PSCell), the first PDCCH having a first maximum number in association with at least one of a first number of PDCCH candidates or a first number of non-overlapped control channel elements (CCEs), wherein the first maximum number is defined for the first CC;
   monitor a second PDCCH on the second CC concurrently with the monitoring of the first PDCCH, the second PDCCH being configured to schedule one of a second PDSCH or a second PUSCH on the second CC, the second PDCCH having a second maximum number in association with at least one of a second number of PDCCH candidates or a second number of non-overlapped CCEs, wherein the second maximum number is defined for the second CC; and
   receive, via at least one of the first PDCCH or the second PDCCH, downlink control information (DCI) scheduling one of the first PDSCH, the first PUSCH, the second PDSCH, or the second PUSCH on the second CC,
   wherein at least one of a first sum of the first number of PDCCH candidates and the second number of PDCCH candidates is less than or equal to N times the second maximum number in association with the second number of PDCCH candidates or N times the first maximum number in association with the first number of PDCCH candidates, or a second sum of the first number of non-overlapped CCEs and the second number of non-overlapped CCEs is less than or equal to N times the second maximum number in association with the second number of non-overlapped CCEs or N times the first maximum number in association with the first number of non-overlapped CCEs, wherein N is a positive integer, and wherein N is based on a hash function.

2. The apparatus of claim 1, wherein the first PDCCH in association with the scheduling of the one of the first PDSCH or the first PUSCH on the second CC is associated with at least one of the first number of PDCCH candidates or the first number of non-overlapped CCEs, and wherein the second PDCCH in association with the scheduling of the at least one of the second PDSCH or the second PUSCH on the second CC is associated with at least one of the second number of PDCCH candidates or the second number of non-overlapped CCEs.

3. The apparatus of claim 1, wherein the first PDCCH includes a first subcarrier spacing, and wherein the second PDCCH includes a second subcarrier spacing that is less than or equal to the first subcarrier spacing.

4. The apparatus of claim 3, wherein the first maximum number in association with the at least one of the first number of PDCCH candidates or the first number of non-overlapped CCEs is based on the first subcarrier spacing, and wherein the second maximum number in association with the at least one of the second number of PDCCH candidates or the second number of non-overlapped CCEs is based on the second subcarrier spacing.

5. The apparatus of claim 1, wherein one of the PCell or the PSCell is associated with a first scheduling cell and a second scheduling cell.

6. The apparatus of claim 5, wherein the first CC and the second CC are in different frequency bands.

7. The apparatus of claim 6, wherein the first CC is associated with a higher frequency range than the second CC.

8. The apparatus of claim 1, wherein N is a multiplier associated with a processing capability of the UE to process at least one of a total number of PDCCH candidates or a total number of non-overlapped CCEs, the total number of PDCCH candidates including the first number of PDCCH candidates and the second number of PDCCH candidates, the total number of non-overlapped CCEs including the first number of non-overlapped CCEs and the second number of non-overlapped CCEs.

9. The apparatus of claim 8, wherein N=1.

10. The apparatus of claim 1, wherein the at least one processor is further configured to transmit capability information in association with the concurrent monitoring of the first PDCCH and the second PDCCH, the capability information indicating a value for N, where N≥1.

11. An apparatus for wireless communication to be performed at a base station, comprising:
    memory; and
    at least one processor coupled to the memory and configured to:
    configure, for a user equipment (UE), a first physical downlink control channel (PDCCH) on a first component carrier (CC) associated with a secondary cell (SCell), the first PDCCH being configured to schedule one of a first physical downlink shared channel (PDSCH) or a first physical uplink shared channel (PUSCH) on a second CC associated with one of a primary cell (PCell) or a primary secondary cell (PSCell), the first PDCCH having a first maximum number in association with at least one of a first number of PDCCH candidates or a first number of non-overlapped control channel elements (CCEs), wherein the first maximum number is defined for the first CC;
    configure, for the UE, a second PDCCH on the second CC, the second PDCCH being configured to schedule one of a second PDSCH or a second PUSCH on the second CC, the second PDCCH being concurrent with the first PDCCH, the second PDCCH having a second maximum number in association with at least one of a second number of PDCCH candidates or a second number of non-overlapped CCEs, wherein the second maximum number is defined for the second CC; and
    transmit, via at least one of the first PDCCH or the second PDCCH, downlink control information (DCI) scheduling one of the first PDSCH, the first PUSCH, the second PDSCH, or the second PUSCH on the second CC, the DCI associated with at least one of a first sum of the first number of PDCCH candidates and the second number of PDCCH candidates being less than or equal to N times the second maximum number in association with the second number of PDCCH candidates or N times the first maximum number in association with the first number of PDCCH candidates, or a second sum of the first number of non-overlapped CCEs and the second number of non-overlapped CCEs being less than or equal to N times the second maximum number in association with the second number of non-overlapped CCEs or N times the first maximum number in association with the first number of non-overlapped CCEs, wherein N is a positive integer, and wherein N is based on a hash function.

12. The apparatus of claim 11, wherein the first PDCCH in association with the scheduling of the one of the first PDSCH or the first PUSCH on the second CC is associated with at least one of the first number of PDCCH candidates or the first number of non-overlapped CCEs, and wherein the second PDCCH in association with the scheduling of the at least one of the second PDSCH or the second PUSCH on the second CC is associated with at least one of the second number of PDCCH candidates or the second number of non-overlapped CCEs.

13. The apparatus of claim 11, wherein the first PDCCH includes a first subcarrier spacing, and wherein the second PDCCH includes a second subcarrier spacing that is less than or equal to the first subcarrier spacing.

14. The apparatus of claim 13, wherein the first maximum number in association with the at least one of the first number of PDCCH candidates or the first number of non-overlapped CCEs is based on the first subcarrier spacing, and wherein the second maximum number in association with the at least one of the second number of PDCCH candidates or the second number of non-overlapped CCEs is based on the second subcarrier spacing.

15. The apparatus of claim 11, wherein one of the PCell or the PSCell is associated with a first scheduling cell and a second scheduling cell.

16. The apparatus of claim 15, wherein the first CC and the second CC are in different frequency bands.

17. The apparatus of claim 16, wherein the first CC is associated with a higher frequency range than the second CC.

18. The apparatus of claim 11, wherein N is a multiplier associated with a processing capability of the UE to process at least one of a total number of PDCCH candidates or a total number of non-overlapped CCEs, the total number of PDCCH candidates including the first number of PDCCH candidates and the second number of PDCCH candidates, the total number of non-overlapped CCEs including the first number of non-overlapped CCEs and the second number of non-overlapped CCEs.

19. The apparatus of claim 11, wherein N=1.

20. The apparatus of claim 11, wherein the at least one processor is further configured to receive, from the UE, capability information in association with concurrent configuration of the first PDCCH and the second PDCCH, the capability information indicating a value for N, where N≥1.

21. A method of wireless communication to be performed at a user equipment (UE), comprising:
monitoring a first physical downlink control channel (PDCCH) on a first component carrier (CC) associated with a secondary cell (SCell), the first PDCCH being configured to schedule one of a first physical downlink shared channel (PDSCH) or a first physical uplink shared channel (PUSCH) on a second CC associated with one of a primary cell (PCell) or a primary secondary cell (PSCell), the first PDCCH having a first maximum number in association with at least one of a first number of PDCCH candidates or a first number of non-overlapped control channel elements (CCEs), wherein the first maximum number is defined for the first CC;
monitoring a second PDCCH on a second CC concurrently with the monitoring of the first PDCCH, the second PDCCH being configured to schedule one of a second PDSCH or a second PUSCH on the second CC, the second PDCCH having a second maximum number in association with at least one of a second number of PDCCH candidates or a second number of non-overlapped CCEs, wherein the second maximum number is defined for the second CC; and
receiving, via at least one of the first PDCCH or the second PDCCH, downlink control information (DCI) scheduling one of the first PDSCH, the first PUSCH, the second PDSCH, or the second PUSCH on the second CC,
wherein at least one of a first sum of the first number of PDCCH candidates and the second number of PDCCH candidates is less than or equal to N times the second maximum number in association with the second number of PDCCH candidates or N times the first maximum number in association with the first number of PDCCH candidates, or a second sum of the first number of non-overlapped CCEs and the second number of non-overlapped CCEs is less than or equal to N times the second maximum number in association with the second number of non-overlapped CCEs or N times the first maximum number in association with the first number of non-overlapped CCEs, wherein N is a positive integer, and wherein N is based on a hash function.

22. The method of claim 21, wherein the first PDCCH in association with the scheduling of the one of the first PDSCH or the first PUSCH on the second CC is associated with at least one of the first number of PDCCH candidates or the first number of non-overlapped CCEs, and wherein the second PDCCH in association with the scheduling of the at least one of the second PDSCH or the second PUSCH on the second CC is associated with at least one of the second number of PDCCH candidates or the second number of non-overlapped CCEs.

23. The method of claim 21, wherein the first PDCCH includes a first subcarrier spacing, and wherein the second PDCCH includes a second subcarrier spacing that is less than or equal to the first subcarrier spacing.

24. The method of claim 23, wherein the first maximum number in association with the at least one of the first number of PDCCH candidates or the first number of non-overlapped CCEs is based on the first subcarrier spacing, and wherein the second maximum number in association with the at least one of the second number of PDCCH candidates or the second number of non-overlapped CCEs is based on the second subcarrier spacing.

25. The method of claim 21, wherein one of the PCell or the PSCell is associated with a first scheduling cell and a second scheduling cell.

26. A method of wireless communication to be performed at a base station, comprising:
configuring, for a user equipment (UE), a first physical downlink control channel (PDCCH) on a first component carrier (CC) associated with a secondary cell (SCell), the first PDCCH being configured to schedule one of a first physical downlink shared channel (PDSCH) or a first physical uplink shared channel (PUSCH) on a second CC associated with one of a primary cell (PCell) or a primary secondary cell (PSCell), the first PDCCH having a first maximum number in association with at least one of a first number of PDCCH candidates or a first number of non-overlapped control channel elements (CCEs), wherein the first maximum number is defined for the first CC;

configuring a second PDCCH on the second CC, the second PDCCH being configured to schedule one of a second PDSCH or a second PUSCH on the second CC, the second PDCCH being concurrent with the first PDCCH, the second PDCCH having a second maximum number in association with at least one of a second number of PDCCH candidates or a second number of non-overlapped CCEs, wherein the second maximum number is defined for the second CC; and transmitting, via at least one of the first PDCCH or the second PDCCH, downlink control information (DCI) scheduling one of the first PDSCH, the first PUSCH, the second PDSCH, or the second PUSCH on the second CC, the DCI associated with at least one of a first sum of the first number of PDCCH candidates and the second number of PDCCH candidates being less than or equal to N times the second maximum number in association with the second number of PDCCH candidates or N times the first maximum number in association with the first number of PDCCH candidates, or a second sum of the first number of non-overlapped CCEs and the second number of non-overlapped CCEs being less than or equal to N times the second maximum number in association with the second number of non-overlapped CCEs or N times the first maximum number in association with the first number of non-overlapped CCEs, wherein N is a positive integer, and wherein N is based on a hash function.

27. The method of claim 26, wherein the first PDCCH in association with the scheduling of the one of the first PDSCH or the first PUSCH on the second CC is associated with at least one of the first number of PDCCH candidates or the first number of non-overlapped CCEs, and wherein the second PDCCH in association with the scheduling of the at least one of the second PDSCH or the second PUSCH on the second CC is associated with at least one of the second number of PDCCH candidates or the second number of non-overlapped CCEs.

28. The method of claim 26, wherein the first PDCCH includes a first subcarrier spacing, and wherein the second PDCCH includes a second subcarrier spacing that is less than or equal to the first subcarrier spacing.

29. The method of claim 28, wherein the first maximum number in association with the at least one of the first number of PDCCH candidates or the first number of non-overlapped CCEs is based on the first subcarrier spacing, and wherein the second maximum number in association with the at least one of the second number of PDCCH candidates or the second number of non-overlapped CCEs is based on the second subcarrier spacing.

30. The method of claim 26, wherein one of the PCell or the PSCell is associated with a first scheduling cell and a second scheduling cell.

31. An apparatus for wireless communication at a user equipment (UE), comprising:

memory; and at least one processor coupled to the memory and configured to:

monitor a first physical downlink control channel (PDCCH) on a first component carrier (CC) associated with a secondary cell (SCell) without monitoring for a common search space (CSS), the first PDCCH being configured to schedule one of a first physical downlink shared channel (PDSCH) or a first physical uplink shared channel (PUSCH) on a second CC associated with one of a primary cell (PCell) or a primary secondary cell (PSCell), the first PDCCH having a first maximum number in association with at least one of a first number of PDCCH candidates or a first number of non-overlapped control channel elements (CCEs), wherein the first maximum number is defined for the first CC, wherein a first subcarrier spacing for the PCell or the PSCell is less than or equal to a second subcarrier spacing for the SCell;

monitor a second PDCCH and the CSS on the second CC, the second PDCCH being configured to schedule one of a second PDSCH or a second PUSCH on the second CC, the second PDCCH having a second maximum number in association with at least one of a second number of PDCCH candidates or a second number of non-overlapped CCEs, wherein the second maximum number is defined for the second CC, wherein to monitor the second PDCCH, the at least one processor is configured to monitor no more than a maximum quantity of total PDCCH candidates per slot or a maximum quantity of total CCEs per slot, wherein the maximum quantity of total PDCCH candidates per slot is based on the first number of PDCCH candidates and the second number of PDCCH candidates or the maximum quantity of total CCEs per slot is based on the first number of CCEs and the second number of CCEs; and receive, via at least one of the first PDCCH or the second PDCCH, downlink control information (DCI) scheduling one of the first PDSCH, the first PUSCH, the second PDSCH, or the second PUSCH on the second CC.

* * * * *